United States Patent [19]

Elsworth et al.

[11] Patent Number: 4,708,371
[45] Date of Patent: Nov. 24, 1987

[54] COUPLING FOR A FUEL MANIFOLD

[75] Inventors: John K. Elsworth, St. Bruno; Ali Nownahal, Mississauga; Kevin Wilson, Brampton, all of Canada

[73] Assignee: Pratt & Whitney Canada Inc., Longueuil, Canada

[21] Appl. No.: 849,880

[22] Filed: Apr. 9, 1986

[51] Int. Cl.[4] .............................................. F16L 39/00
[52] U.S. Cl. ........................................ 285/13; 60/739; 285/131; 285/924; 285/371; 285/28
[58] Field of Search ..................... 285/13, 14, 28, 178, 285/371, 372, 398, 81, 131, 924; 138/114; 60/734, 740, 739, 746, 741, 747; 137/118

[56] References Cited

U.S. PATENT DOCUMENTS

| | | | |
|---|---|---|---|
| 2,447,185 | 8/1948 | Keim | 285/23 |
| 2,806,354 | 9/1957 | Cook | 60/39.36 |
| 2,814,931 | 12/1957 | Johnson | 60/35.6 |
| 2,846,845 | 8/1958 | Parker | 60/39.09 |
| 2,934,090 | 4/1960 | Kenann et al. | 137/625.5 |
| 2,949,736 | 8/1960 | Rubbra | 60/39.32 |
| 3,050,077 | 8/1962 | Wheatley | 137/312 |
| 3,144,035 | 8/1964 | Hablanian et al. | 137/1 |
| 3,371,482 | 3/1968 | Camboulives et al. | 60/39.32 |
| 3,377,087 | 4/1968 | Samerdyke et al. | 285/14 |
| 3,385,613 | 5/1968 | McCall | 285/178 |
| 3,489,435 | 1/1970 | Weber | 285/13 |
| 3,541,788 | 11/1970 | Schutz | 60/39.09 |
| 3,556,444 | 1/1971 | Kopp | 244/135 |
| 3,641,542 | 2/1972 | Grove et al. | 137/312 |
| 3,949,775 | 4/1976 | Cornell | 137/118 |
| 4,028,888 | 6/1977 | Pilarczyk | 60/739 |
| 4,122,968 | 10/1978 | Germain | 138/114 |
| 4,142,084 | 2/1979 | Torrani | 219/60 |
| 4,149,568 | 4/1979 | Kuntz et al. | 138/114 |
| 4,159,024 | 6/1979 | Getman | 137/312 |
| 4,185,462 | 1/1980 | Morse, II et al. | 60/261 |
| 4,226,365 | 10/1980 | Norris et al. | 137/118 |
| 4,384,557 | 5/1983 | Johnson | 285/14 |
| 4,422,675 | 12/1983 | Norris et al. | 285/14 |
| 4,467,610 | 8/1984 | Pearson et al. | 285/13 |

FOREIGN PATENT DOCUMENTS

| | | | |
|---|---|---|---|
| 564280 | 7/1958 | Belgium . | |
| 1245662 | 7/1967 | Fed. Rep. of Germany . | |
| 2804331 | 8/1979 | Fed. Rep. of Germany | 138/114 |
| 1146303 | 11/1957 | France | 285/13 |
| 2373212 | 8/1978 | France | 138/114 |
| 2511751 | 2/1983 | France | 285/13 |
| 6609405 | 1/1967 | Netherlands | 285/178 |
| 425374 | 5/1967 | Switzerland | 285/178 |
| 2107809 | 5/1983 | United Kingdom | 285/13 |

Primary Examiner—Alexander Grosz
Assistant Examiner—Eric K. Nicholson
Attorney, Agent, or Firm—Schwartz, Jeffery, Schwaab, Mack, Blumenthal & Evans

[57] ABSTRACT

A manifold is provided surrounding the casing of a combustion chamber for a gas turbine engine, and the manifold is mounted in spaced aligned segments with couplings between the segments. Each coupling includes a removable tube connector extending between passageways forming the fuel line in the manifold. The tube connector is provided with a radial collar thereon, and a sleeve which is adapted to enclose the space between ends of respective manifold segments is also provided with a mating collar adapted to receive the radial collar on the tube connector. The sleeve is retractable over the ends of the manifold segments, and movement of the sleeve in one direction or the other will also move the tube connector by virtue of the interlocking collars. The manifold segments are provided with a second passageway for draining leaked fuel. The space defined by the sleeve is sealed, and fuel can communicate through to the second passageway for drainage outboard of the engine. The sleeve can be locked in an assembled position, thereby locking the tube connector in a sealed relationship with the ends of the manifold segments within the first passageway.

7 Claims, 6 Drawing Figures

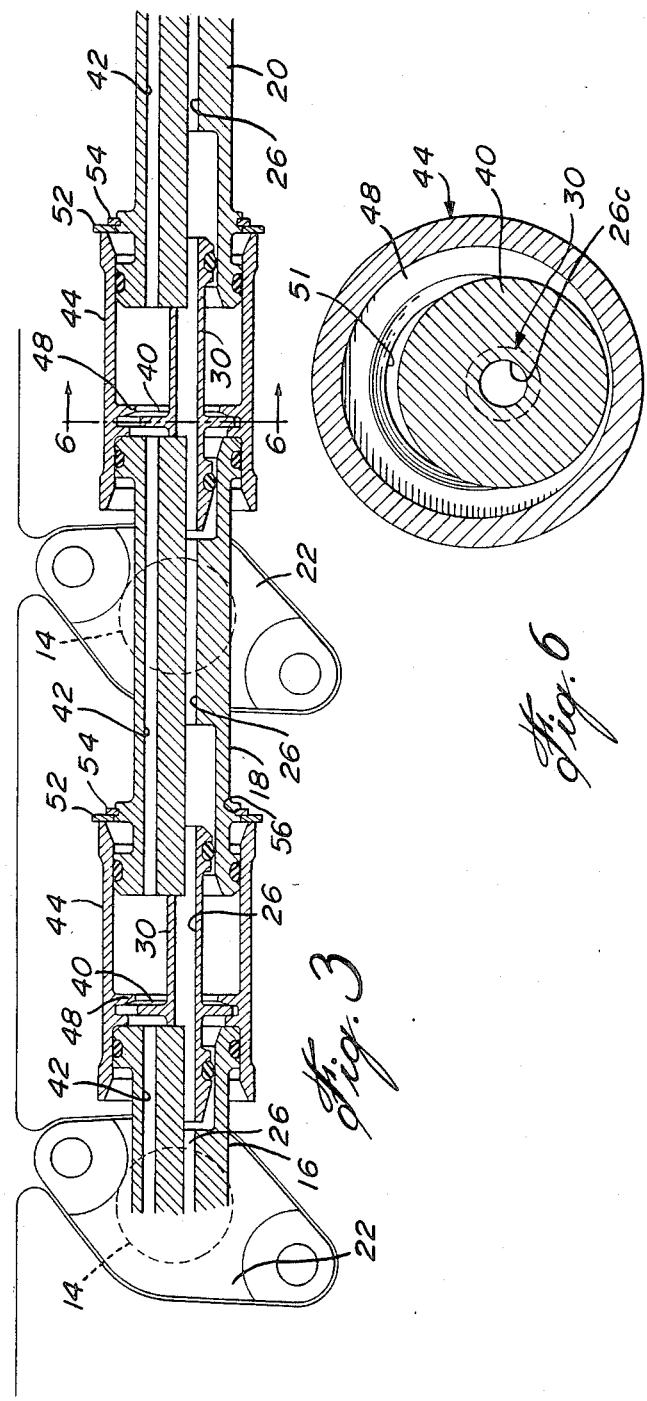

COUPLING FOR A FUEL MANIFOLD

BACKGROUND OF THE INVENTION

1. Field of the Invention

The present invention relates to a fuel manifold, and more particularly to a coupling for such a fuel manifold which provides drainage of leaked fuel to a safe environment.

2. Description of the Prior Art

Gas turbine engines include fuel lines and in particular fuel manifolds which surround a combustion chamber and are adapted to communicate with fuel nozzles projecting within the combustion chamber. The manifold may be made up of segments interconnected by couplings. The joints so formed are subject to leakage, and, in the light of the high temperature environment, possibly spontaneous combustion.

It is imperative that caution be taken to avoid any leakage of fuel from such a system. Such leakage could result in dangerous uncontrolled combustion.

U.S. Pat. No. 4,422,675, issued Dec. 27, 1983 to Norris et al, describes a slidable sleeve which may be placed about a coupling for the purpose of containing fuel if a leak occurs in the coupling. There is, however, no provision for draining the leaked fuel to a safe location from the sleeve other than a small leak indicator passage. The purpose of this passage is merely to allow the detection of leakage and not for the purposes of drainage.

SUMMARY OF THE INVENTION

It is an aim of the present invention to provide an improved coupling protective shield in combination with a drainage conduit for directing fuel which may leak from the coupling to a safe environment.

It is also an aim of the present invention to provide an easily assembled coupling for connecting the manifold segments.

It is a further aim of the present invention to provide a facility to readily disconnect a fuel nozzle from the fuel manifold system.

A construction in accordance with the present invention comprises a coupling adapted to connect a pair of aligned manifold segments fitted with fuel nozzles. The manifold segments each include a first passageway extending axially of the segment and a second passageway parallel to said first passageway. A connector tube has an axially extending passageway. The connector tube is adapted to sealingly fit within the first passageway end portions of respective segments. A retractable sleeve is adapted to sealingly engage each end of said respective segments, thus enclosing the tubular connector. A collar is provided on the exterior surface of the tube, and a mating collar is provided on the internal surface of the sleeve which is adapted to engage the collar on the connector tube such that any sliding movement of the sleeve will cause corresponding sliding movement of the tube. The sleeve is a conduit for directing any leaked fuel to the second passageway in the respective segments while providing a fire resistant heat shield to the joint so formed. The sleeve also provides an assembly system for the connector tube by means of the mating collars whereby the tube can be retracted or advanced by moving the sleeve, and finally locked in place by locking the sleeve on the outer surface of the manifolds.

BRIEF DESCRIPTION OF THE DRAWINGS

Having thus generally described the nature of the invention, reference will now be made to the accompanying drawings, showing by way of illustration, a preferred embodiment thereof, and in which:

FIG. 3 is a horizontal cross-section taken axially of a portion of the manifold;

FIG. 6 is a transverse cross-section taken along line 6—6 of FIG. 3.

DESCRIPTION OF THE PREFERRED EMBODIMENTS

Figure 2:
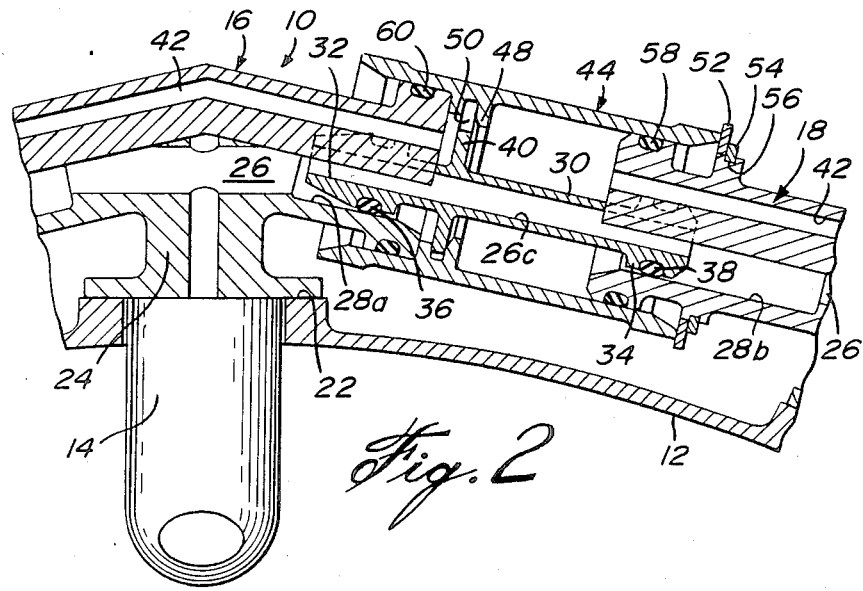
FIG. 2 is an enlarged fragmentary vertical cross-section taken along line 2—2 of FIG. 1.

Referring now to the drawings, the manifold of the type referred to is part of a fuel delivery system to a combustion chamber in a gas turbine engine. The fuel manifold 10 surrounds the periphery of the combustion chamber casing 12. A series of fuel nozzles 14, which extend within the combustion chamber, communicate with the manifold 10 at spaced-apart locations as shown in FIG. 2.

The manifold 10 is made up of a plurality of manifold segments as represented by the segments 16, 18, and 20 in FIG. 3. Each segment is mounted to the combustion chamber casing 12 by means of mounting brackets 22. The mounting brackets also serve as fuel supply lines 24 for the nozzles 14. The manifold segments 16, 18, 20, etc., include fuel passageways 26 which communicate with fuel supply lines 24.

Figure 4:
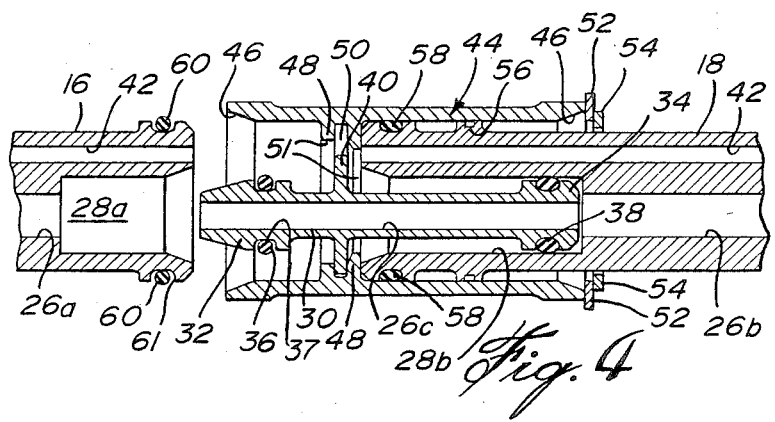
FIG. 4 is a cross-sectional view similar to FIG. 3, showing elements of the manifold in a retracted position.
Figure 5:
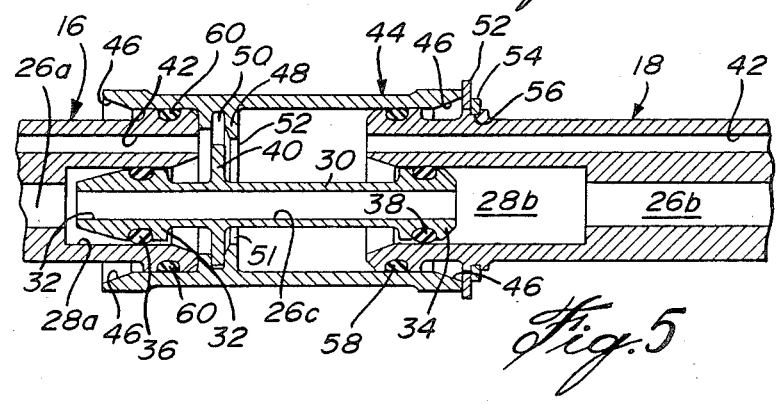
FIG. 5 is a cross-sectional view similar to FIG. 4, showing the elements in an assembled position.

The ends of the segments 16, 18, 20, are spaced apart as shown in the drawings and are connected by the couplings as will be described. The fuel passageway 26 in each manifold segment is enlarged at the ends thereof. For instance, passageway 26 in manifold segment 16 is enlarge at 28a, as shown in FIGS. 2, 4, and 5. The other end of the manifold, for instance, represented by segment 18, has an enlarged passageway 28b communicating with the passageway 26.

The coupling between the respective ends of the manifold segments includes a tube connector 30 having enlarged heads 32 and 34, one at each end thereof, which in turn are adapted to fit within the passageway enlargements 28a and 28b respectively. The tube connector 30 includes O-rings 36 and 38 adapted to seal the tube connector enlarged heads 32 and 34 once they are fitted within the passageway enlargements 28a and 28b. As shown in FIG. 4, the enlarged head 32 is provided with a groove 37 to receive a typical O-ring 36. Tube connector 30 has a passageway 26c which communicates the passageway 26a with passageway 26b of respective manifold segments 16 and 18. Tube connector 30 is provided with a radially extending collar 40 at a predetermined location from the end thereof as shown in the drawings.

The manifold segments are also provided with a fuel drainage passageway 42 which will be communicated by the coupling.

The coupling includes a sleeve 44 adapted to slide over the periphery of the manifold segments as will be described. The sleeve 44 includes tapered ends 46 to enable its assembly over the ends of the manifold segments. Within the sleeve 44 is a collar 48 provided with an annular slot 50. The slot 50 is adapted to matingly engage the collar 40 of the tube connector 30. The passageway 26 in the manifold segment is offset relative to the axis of the manifold segment. Likewise, the tube connector 30 will have an axis which is offset from the axis of the sleeve 44. The opening defined by the collar 48 of the sleeve 44 is truly concentric with the sleeve 44 and, therefore, the center of the opening 51 is offset relative to the collar 40 on the tube connector 30. The offset openings 51 are such that when the tube connector 30 is being fitted within the sleeve, the collar 40 must be passed centrally of the openings 51, but when the tube connector 30 is within the sleeve and adapted to be advanced to be engaged with the passageway 26a, the axis thereof is offset from the center of the opening and, therefore, locked within the slot 50. As seen in FIGS. 4 and 5, the tube connector 30 can be advanced or retracted merely by sliding the sleeve 44 to which the tube connector 30 is now locked.

Figure 1:
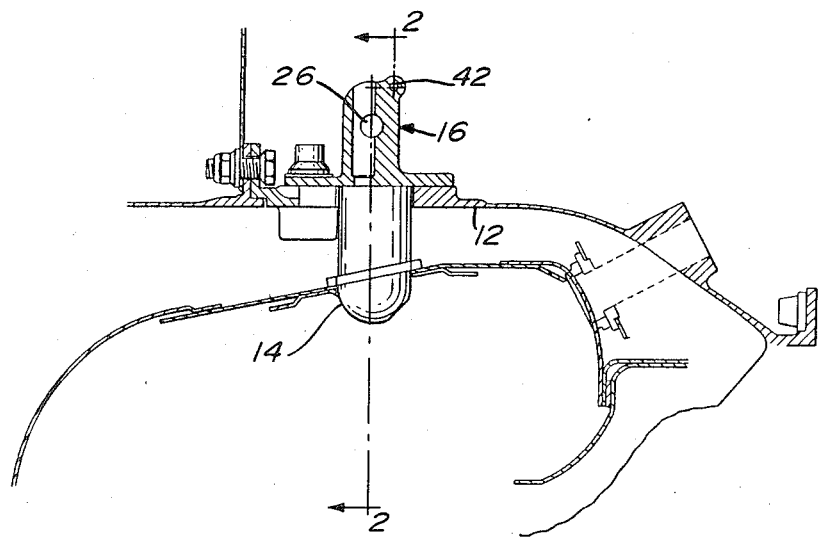
FIG. 1 is an axial cross-section of a typical combustion chamber including a manifold in accordance with the present invention.

O-rings 58 and 60 are provided at the respective ends of the manifold segments and are adapted to engage the inner surface of the sleeve 44. A washer ring 52 is provided at one end of the sleeve 44, as shown in the drawings, and cooperates with a locking ring 54. The locking ring 54, when the coupling is assembled, engages the groove 56 in the periphery of the manifold segment 18. The distance of the locking ring is such that the collar 48 abuts the end of the other manifold segment 16, as shown in FIGS. 1 and 4.

When it is required to disassemble the sleeve 44, the locking ring 54 is disengaged from the groove 56, and the sleeve 44 is slid rearwardly, thereby causing the tube connector 30 to slide within the passageway enlargement 28b, thereby disengaging the enlarged head 32 from the passageway enlargement 28a in the manifold segment 16. The sleeve 44 is retracted to provide access to the fuel nozzles 14 without having to disassemble the complete manifold. The tube connector 30 can also be removed to be changed, or to have the O-rings thereof replaced, by aligning the collar 40 thereof through the opening 51 of the collar 48 of the sleeve and thereby disengaging the tube connector 30 from the sleeve 44.

In the same manner, when it is required to assemble the coupling to respective manifold segment ends, the tube connector 30 is first placed within the sleeve 44 with one end in the passageway enlargement 28b back to its rearmost position. The collar 40 is aligned to fit within the opening 51 of the collar 48 of the sleeve 44 and then allowed to drop into position within the slot 50 offset from the opening such that the collar 40 is locked within the slot 50 of the collar 48. The sleeve 44 is then advanced towards the manifold segment 16 which causes the enlarged head 32 with its O-ring 36 to enter the passageway enlargement 28a and thus sealingly engage the end of the manifold segment. Likewise, the sleeve will fit over the O-ring 60, and when the sleeve 44 is at its extreme advanced position whereby the collar 48 abuts against the end of the manifold segment 16, the locking ring 54 coincides then with the groove 56 and is locked therein, abutting against the washer 46 which in turn abuts against the end of the sleeve 44 immobilizing it.

The sleeve 44 acts as a heat shield for the coupling between the manifold segments. Thus, the tube connector 30 may be made of aluminum or other light alloys. Furthermore, because of the opening 51 provided between the collar 40 and the collar 48, at least when it is offset therefrom, fluid communication is provided between the drainage passageway 42 of the manifold segment 16 and the drainage passageway 42 of the manifold segment 18. Thus, if there is leakage over the O-rings 36 or 38, that is, between the tube connectors 30 and the passageways 26a and 26b, the fuel will be contained within the sleeve and allowed to pass through to drainage passageway 42 to be eventually delivered outboard of the engine.

We claim:

1. A coupling for a fuel manifold defining a fuel line passageway, comprising a tube connector which extends between the ends of two manifold segments to connect the fuel line passageway thereof, the tube connector sealingly fitting within end portions of the fuel line passageway at said ends of respective manifold segments; a retractable sleeve sealingly engaging over said ends of the respective manifold segments, thus enclosing the tube connector and defining a space therewith, locking means provided between the tube and sleeve such that any sliding movement of the sleeve will cause corresponding sliding movement of the tube, the end portions of the fuel line passageway accommodating the tube connector in axial sliding relationship and the length of the tube connector being such as to allow connecting or disconnecting of the coupling by sliding the sleeve and said tube connector without moving the manifold segments.

2. A coupling as defined in claim 1 wherein the locking means comprises a first collar provided on the exterior surface of the tube and a mating collar provided on the internal surface of the sleeve which engages the collar on the tube.

3. A coupling as defined in claim 1 wherein the sleeve and tube connector may be retracted to have access to the fuel nozzles.

4. A coupling as defined in claim 2, wherein the mating collar provided on the interior surface of the sleeve defines a concentric circular opening having a diameter at least as large as the collar on the tube connector, and the collar on the sleeve having an annular slot defined therein receiving the collar on the tube connector, and when the tube connector and sleeve are assembled such that the tube connector is aligned with said fuel line passageway, the longitudinal axis of the tube connector will be offset from the longitudinal axis of the sleeve and the concentric opening such that the collar on the tube connector will be seated within a portion of the slot defined in the collar on the sleeve, thereby providing the locking means between the sleeve and tube connector.

5. A coupling as defined in claim 1, wherein a second fuel passageway is provided in the manifold segments and communicates with the space, whereby any leaked fuel at the coupling thereof is drained to the second passageway defined in the manifold segments and is removed from the fuel manifold by way of said second passageway.

6. A coupling as defined in claim 1, wherein the sleeve provides a protective shield for the coupling.

7. A coupling as defined in claim 4, wherein the offsetting of the collar on the sleeve and the collar on the tube connector is such as to provide a fluid opening across the locking means between the respective collars such as to provide drainage fuel communication in the space.

* * * * *